(12) United States Patent  
Ebisuzaki et al.

(10) Patent No.: US 9,807,013 B1  
(45) Date of Patent: Oct. 31, 2017

(54) NETWORK BROADCAST TRAFFIC FILTERING

(71) Applicant: Amazon Technologies, Inc., Seattle, WA (US)

(72) Inventors: Gavin Akira Ebisuzaki, Bellevue, WA (US); Christopher James BeSerra, Federal Way, WA (US); Gary S. Shankman, Olympia, WA (US); Terry Lee Nissley, Lacey, WA (US)

(73) Assignee: Amazon Technologies, Inc., Seattle, WA (US)

( * ) Notice: Subject to any disclaimer, the term of this patent is extended or adjusted under 35 U.S.C. 154(b) by 222 days.

(21) Appl. No.: 14/662,818

(22) Filed: Mar. 19, 2015

(51) Int. Cl.
*H04L 12/801* (2013.01)
*H04L 12/18* (2006.01)
*H04L 12/863* (2013.01)
*H04L 29/12* (2006.01)

(52) U.S. Cl.
CPC .............. *H04L 47/12* (2013.01); *H04L 12/18* (2013.01); *H04L 29/12028* (2013.01); *H04L 47/50* (2013.01)

(58) Field of Classification Search
None
See application file for complete search history.

(56) References Cited

U.S. PATENT DOCUMENTS

| | | | |
|---|---|---|---|
| 7,116,672 B1 * | 10/2006 | Sivakumar | H04L 12/4625 370/395.4 |
| 2004/0062200 A1 * | 4/2004 | Kesavan | H04L 47/10 370/235 |
| 2008/0205396 A1 * | 8/2008 | Dakshinamoorthy | H04L 12/1886 370/390 |
| 2014/0233444 A1 * | 8/2014 | Wang | H04W 72/1242 370/311 |
| 2015/0304116 A1 * | 10/2015 | Chan | H04L 12/18 370/230 |

OTHER PUBLICATIONS

ASPEED Technology, Inc., "AST 2300," <http://www.aspeedtech.com/products.php?fPath=20&rId=200x, 2 pages (accessed Mar. 18, 2015).

* cited by examiner

*Primary Examiner* — Chi H Pham
*Assistant Examiner* — Vladislav Agureyev
(74) *Attorney, Agent, or Firm* — Klarquist Sparkman, LLP

(57) ABSTRACT

Techniques and solutions for automatically filtering network broadcast traffic are described. For example, network broadcast traffic can be automatically filtered by turning broadcast filtering on and off (e.g., as a continuous strobe pattern that alternates enabling and disabling of broadcast filtering). For example, a computing device (e.g., via a network interface or management controller of the computing device) can automatically enable network broadcast traffic filtering during a first time period (e.g., a four second time period) and disable network broadcast traffic filtering during a second time period (e.g., a one second time period). A computing device can also automatically enable and disable network broadcast traffic filtering according to an on-off pattern (e.g., based on various criteria, such as network queue size, broadcast traffic volume, etc.).

16 Claims, 7 Drawing Sheets

NETWORK BROADCAST TRAFFIC FILTERING

BACKGROUND

Networks, such as public and/or private networks, can be large and complicated. For example, the network architecture of a large company may span many locations, such as data centers, cities, states, countries, and continents. Furthermore, the network architecture of a large company may be divided into a variety of different structures, each of which may provide different services external and/or internal to the company.

Managing network traffic so that networks operate efficiently can be a difficult task. Managing network traffic can be particularly difficult in large networks, such as data centers, which can contain many computing devices communicating on the same network. In some situations, excessive network traffic can overload network controllers and result in dropped network packets or hardware or software failures (e.g., a network device or component may crash).

In some solutions, network traffic can be managed by networking equipment, such as network routers and switches, using rules and policies. However, such network traffic monitoring devices can be expensive and time consuming to manage.

DETAILED DESCRIPTION

Overview

The following description is directed to techniques and solutions for automatically filtering network broadcast traffic. For example, a computing device can automatically filter network broadcast traffic by turning a broadcast filter on and off at various times. For example, a computing device can automatically enable network broadcast traffic filtering during a first time period (e.g., a four second time period) and disable network broadcast traffic filtering during a second time period (e.g., a one second time period). A computing device can also automatically enable and disable network broadcast traffic filtering according to an on-off pattern (e.g., based on various criteria, such as network queue size, broadcast traffic volume, etc.).

In some implementations, a computing device such as a server computer comprises a management controller with a network interface that is connected to a management network carrying management traffic. The management controller performs automatic network broadcast traffic filtering by enabling network broadcast traffic filtering during a first time period and disabling network broadcast traffic filtering during a second time period. The management controller repeats the first time period and the second time as a continuous strobe pattern that alternates enabling and disabling of the network broadcast traffic filtering.

In some implementations, a computing device comprising a management controller performs automatic network broadcast traffic filtering according to an on-off pattern that repeats (e.g., an on-off pattern that repeats continuously for a period of time). For example, the on-off pattern can be a fixed pattern (e.g., a pre-determined amount of time on and a pre-determined amount of time off) or a variable or dynamic pattern (e.g., a pattern that changes based on various criteria, such as network broadcast traffic, network queue size, etc.).

In some implementations, a computing device comprising a network interface (e.g., an embedded network interface) performs automatic network broadcast traffic filtering according to an on-off pattern. For example, the on-off pattern can be a fixed pattern (e.g., a pre-determined amount of time on and a pre-determined amount of time off) or a variable or dynamic pattern (e.g., a pattern that changes based on various criteria, such as network broadcast traffic, network queue size, etc.). The computing device can perform broadcast filtering for a network connection that carries broadcast traffic as well as general network traffic (e.g., a network connection that provides Internet connectivity).

Performing automatic network broadcast traffic filtering can improve network performance and reduce problems that may be associated with high volumes of broadcast packets. For example, in some situations a network with a significant amount of broadcast traffic can overload network interfaces (e.g., network interfaces associated with management controllers and/or other types of network interfaces). Overloading a network interface with broadcast traffic can result in degraded performance. For example, if a network packet queue of a network interface fills up with broadcast packets, then other packets (e.g., directed network packets for managing server computers, network packets used by applications and services, etc.) may be dropped until space in the queue is available. Dropping data packets can result in slow response times (e.g., by applications or services running on the computing devices) or other problems (e.g., software or hardware crashes). As another example, overloading a network interface with broadcast traffic can cause the network interface to shut down (e.g., requiring the network interface to be manually restarted).

Using the automatic network broadcast traffic filtering technologies described herein, these problems can be reduced or eliminated. For example, enabling broadcast filtering can reduce broadcast packets in the network queue thus reducing the likelihood that packets will be dropped due to a full queue. As another example, enabling broadcast filtering can reduce occurrences of the network interface becoming unresponsive or shutting down. As yet another example, overall responsiveness to non-broadcast network traffic can be improved as the network interface needs to spend less time processing broadcast traffic (e.g., thus increasing responsiveness of applications and services running on the device).

Performing automatic network broadcast traffic filtering can improve network performance and reduce problems without negatively affecting non-broadcast traffic. Because broadcast traffic filtering only applies to broadcast packets, non-broadcast packets are unaffected. Furthermore, by using a repeating pattern of enabling and disabling broadcast filtering (e.g., an on-off pattern) broadcast traffic is still received and processed during the time periods when broadcast filtering is disabled. Even though there are times when broadcast traffic is blocked (when broadcast filtering is enabled), network performance may not be significantly affected. For example, broadcast traffic is typically less important to application and service performance than directed traffic. In addition, broadcast traffic can be repeated if needed. For example, a computing device that is sending an address resolution protocol (ARP) broadcast request will repeat the request if a response is not received. Finally, due to the nature of broadcast traffic, most devices on the network typically do not need to receive or process the majority of broadcast traffic (e.g., an ARP broadcast request only needs to be received by the one network interface on the network with the IP address contained in the ARP request).

In an experimental implementation of some of the technologies described herein, the performance of network broadcast traffic filtering was evaluated in a test network. Without using any broadcast filtering, management controllers were overloaded (resulting in dropped packets and/or management controller shutdown) when the amount of broadcast traffic reached approximately 9,000 broadcast packets per second. When using the broadcast filtering technologies described herein, management controllers were unaffected (no dropped packets or management controller shutdown) with broadcast traffic levels up to 15,000 broadcast packets per second. In a specific test situation, an on-off pattern of four seconds enabled with one second disabled was used.

Network Broadcast Traffic

In the technologies described herein, broadcast traffic can be filtered. Broadcast traffic (also called network broadcast traffic, network broadcast packets, or broadcast packets) refers to network packets that are sent to a broadcast network address (a network address associated with a plurality of hosts, such as a network-wide broadcast address or a broadcast address corresponding to a subnet). One example of a broadcast address is an Internet Protocol (IP) address where the host portion of the IP address is all ones. For example, the broadcast IP address for the subnet 192.168.1.0/24 is 192.168.1.255.

Examples of broadcast packets that are common on IP networks include address resolution protocol (ARP) broadcast packets and universal plug and play (UPnP) multicast packets. Other types of broadcast packets may be present as well.

Network broadcast traffic is different from directed traffic. Directed traffic (also called direct traffic or unicast traffic) is traffic that is sent to a particular host. For example, in an IP network, a directed packet is a packet that is sent to a particular destination IP address.

Management Controller

In the technologies described herein, automatic network broadcast traffic filtering can be performed by a management controller with an associated network interface. A management controller (also called a baseboard management controller (BMC)) is a specialized processor that monitors the status of a computing device (e.g., a server computer or other type of computing device) and provides other management functions. For example, a management controller can monitor the status of fans, temperature, CPU load, and/or other parameters using a variety of sensors. A management controller can also manage the computing device (e.g., perform remote restarts).

A management controller can be associated with a network interface (e.g., a network interface that is integrated with the management controller or that is otherwise associated with the management controller). The network interface of the management controller (also called management controller network interface) is used by the management controller for sending and receiving network traffic. In some implementations, the network interface of the management controller is an integrated physical layer network interface (also called a "PHY") and associated media access control (MAC) protocol implementation compatible with a physical network architecture (e.g., Ethernet).

A management controller with an associated network interface supports filtering of broadcast traffic. For example, a management controller can enable the filter (i.e., enable network broadcast traffic filtering). When the filter is enabled, network broadcast packets are blocked (or otherwise not received or processed) by the management controller. For example, when the filter is enabled, broadcast packets can be intentionally ignored (e.g., intentionally not processed by the network interface and/or management controller). The management controller can also disable the filter (i.e., disable network broadcast traffic filtering). When the filter is disabled, network broadcast packets are received and processed by the management controller.

In some implementations, the management controller and associated network interface only provide simple broadcast filtering that supports enabling the filter or disabling the filter. With a simple broadcast filter, no additional broadcast filtering options are provided other than enabling and disabling of the filter.

An example of a suitable management controller that supports filtering of broadcast traffic is the AST2300 management controller from ASPEED® Technology, Inc.

Software and/or hardware of the management controller, associated network interface, or operating system can be used to control enabling and disabling of the broadcast filter (e.g., according to an on-off pattern). In some implementations, the firmware of the management controller controls enabling and disabling of the broadcast filter.

Environments for Automatically Filtering Network Broadcast Traffic

In any of the implementations described herein, automatic filtering of network broadcast traffic can be performed within environments where computing devices (e.g., server computers, desktops and laptops, tablets, smart phones, networking equipment, etc.) are connected via networks. For example, a network environment can be maintained by a business or organization that includes computing devices located in one or more data centers (e.g., data centers located in different geographical areas). The environment can include various types of packet-switched networks (e.g., public and/or private packet-switched networks, the Internet, etc.). Automatic filtering of network broadcast traffic can be performed within a network environment that carries management traffic and/or within a network environment that carries other types of network traffic (e.g., network traffic that would typically be sent and received by a computing device connected to a network such as the Internet).

Figure 1:
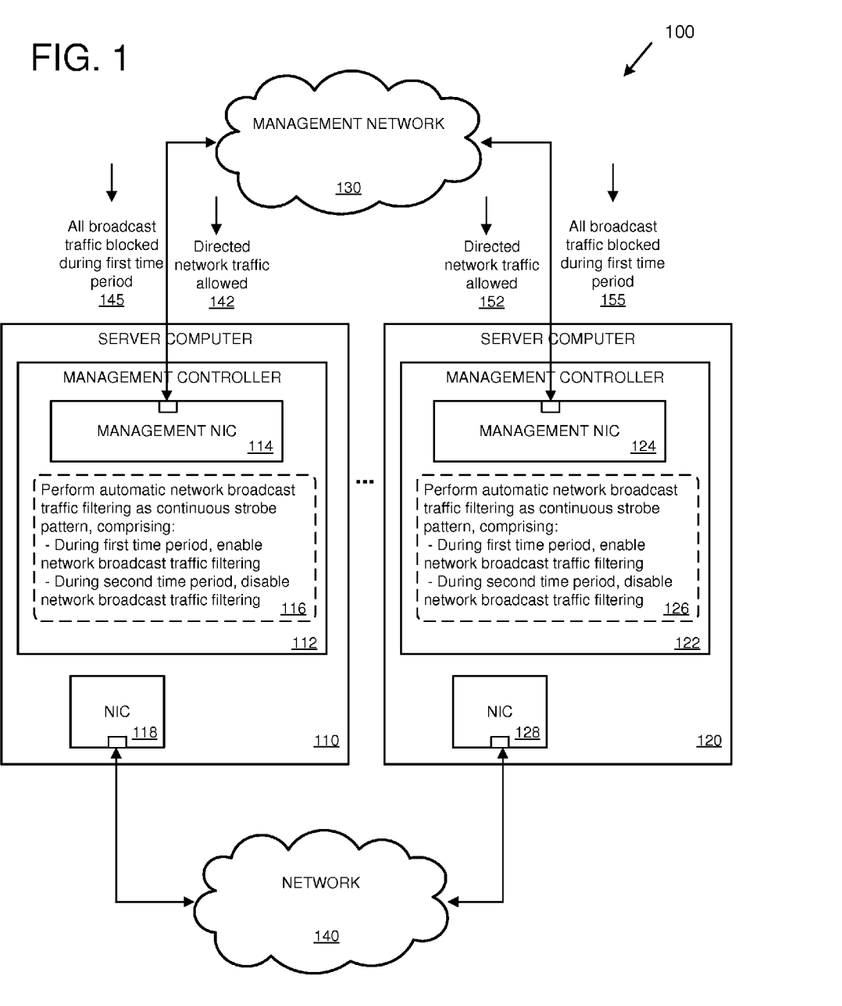
FIG. 1 is a diagram of an example environment supporting automatic network broadcast traffic filtering by a management controller using a first time period and a second time period.

FIG. 1 is a diagram of an example environment 100 within which automatic filtering of network broadcast traffic can be performed. The environment 100 supports automatic network broadcast traffic filtering by a management controller using a first time period and a second time period. In the environment 100, server computers (including the depicted server computers 110 and 120) are connected to two different networks. First, the server computers are connected to a management network 130 via management network interfaces associated with management controllers of the server computers. Specifically, management controller 112 of server computer 110 is connected to the management network 130 via the management network interface 114 (also called a management network interface controller (NIC)), and management controller 122 of server computer 120 is connected to the management network 130 via the management network interface 124. Second, the server computers are connected to general data network 140 via network interface controllers (NICs) of the server computers. Specifically, server computer 110 is connected to the network 140 via NIC 118 and server computer 120 is connected to the network 140 via NIC 128. While two server computers (110 and 120) are depicted for ease of illustration, any number of server computers can be connected to the management network 130 and/or the general data network 140, and a particular server computer does not have to be connected to both networks.

The management network 130 carries management network traffic among a number of connected computing devices. The management network 130 is used to communicate management information between the computing devices. For example, the computing devices can communicate hardware and/or software status or control information via the management network 130 (e.g., communicate CPU load, component temperature, application response times, etc. to a monitoring system that receives and processes the status information, sends management commands, generates alerts if needed, etc.).

In some implementations, the management network 130 is an independent network that carries only management traffic among the connected devices. For example, the management network 130 can be a separate network with separate network cables, switches, and routers that connects computing devices at a single location (e.g., as a local area network (LAN) that could be a private LAN of a business or organization) and/or at a number of different locations (e.g., as a wide area network (WAN) that could be a private WAN connecting data centers at a number of geographical locations). In some implementations, the management network 130 is an IP-based network. In some implementations, the management network 130 is a lower bandwidth network than the general data network 140 (e.g., the management network 130 may be a 1 Gbps network while the general data network may be a 100 Gbps network).

The general data network 140 carries network traffic other than the management traffic carried by the management network 130. For example, the general data network 140 can be a local area network and/or a wide area network carrying network traffic between the connected devices and other devices (e.g., connected via the Internet). The general data network 140 can carry network traffic supporting applications or services of the connected devices (e.g., database traffic, web server traffic, customer traffic, etc.).

The management controllers (112 and 122) support automatic filtering of network broadcast traffic. For example, as depicted at 116, management controller 112 performs automatic network broadcast traffic filtering as a continuous strobe pattern by enabling network broadcast traffic filtering during a first time period and disabling network broadcast traffic filtering during a second time period. The first and second time periods are repeated by the management controller in a continuous strobe pattern that alternates enabling and disabling of the network broadcast traffic filtering (e.g., in one implementation the strobe pattern is four seconds on, one second off). As depicted at 145, all broadcast traffic received by the management network interface 114 is blocked during the first time period (e.g., the received broadcast packets are ignored or otherwise not processed). During the second time period, broadcast traffic received by the management network interface 114 is received and processed by the management controller 112. Regardless of whether broadcast traffic filtering is enabled or disabled, directed network traffic received by the management network interface 114 is still received and processed by the management controller 112, as depicted at 142 (i.e., network broadcast traffic filtering does not interfere with, block, or affect directed traffic). Server computer 120 performs the same operations, as depicted at 126, 155, and 152. In an example implementation, during each five-second period broadcast filtering is enabled for four seconds and disabled for one second, which results in broadcast packets being blocked 80% of the time and allowed 20% of the time.

In other implementations, a separate management network 130 is not present in the environment 100. In such implementations, the management network interfaces (e.g., 114 and 124) are connected (e.g., with separate IP addresses) to the general data network 140 and the general data network 140 carries all network traffic, including management traffic. Automatic network broadcast traffic filtering can still be performed by the management controllers (e.g., 112 and 122) in such implementations in the same manner as described above with regard to the separate management network 130.

In some implementations, broadcast filtering is performed for traffic on the general data network 140 (e.g., in addition to broadcast filtering being performed for traffic on the management network 130). For example, the computing device (e.g., 110 or 120) and/or network interface connected to the general data network 140 (e.g., NIC 118 or NIC 128) can be controlled to enable or disable broadcast filtering according to a first time period and a second time period.

Figure 2:
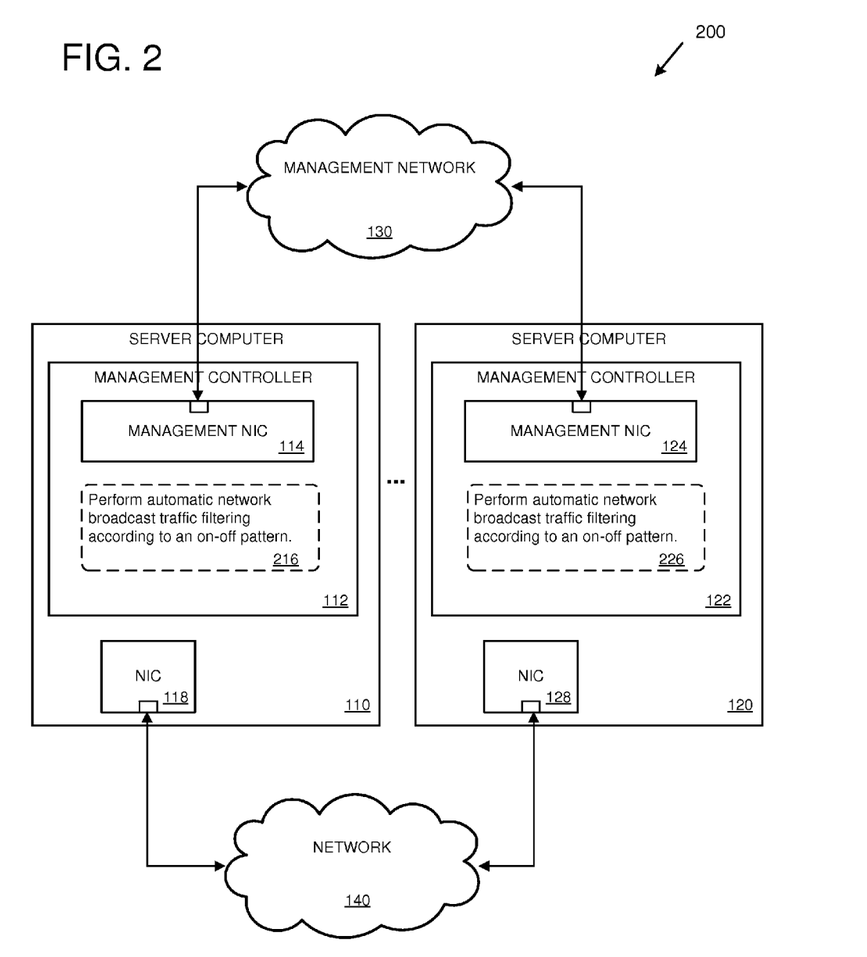
FIG. 2 is a diagram of an example environment supporting automatic network broadcast traffic filtering by a management controller using an on-off pattern.

FIG. 2 is a diagram of an example environment 200 within which automatic filtering of network broadcast traffic can be performed. The environment 200 supports automatic network broadcast traffic filtering by a management controller using an on-off pattern.

As depicted in the environment 200, the management controllers (e.g., 112 and 122) perform automatic network broadcast traffic filtering according to an on-off pattern (e.g., as depicted at 216 and 226) for enabling and disabling network broadcast traffic filtering by the management controllers (e.g., 112 and 122).

For example, the server computer 110 and/or management controller 112 can determining an on-off pattern for switching network broadcast traffic filtering between an enabled setting and a disabled setting, an on-off pattern with pre-determined or fixed time periods, or an on-off pattern with dynamic time periods). When the on-off pattern specifies that network broadcast traffic filtering is to be enabled, the management controller 112 enables network broadcast traffic filtering that blocks all network broadcast packets received by the management network interface 114 of the management controller 112. When the on-off pattern specifies that network broadcast traffic filtering is to be disabled, the management controller 112 disables network broadcast traffic filtering so that network broadcast packets received by the management network interface 114 are processed by the management controller 112. Regardless of whether broadcast traffic filtering is enabled or disabled, directed network traffic received by the management network interface 114 is still received and processed by the management controller 112 (i.e., network broadcast traffic filtering does not interfere with, block, or affect directed traffic). Server computer 120 can perform the same operations for network broadcast traffic filtering using an on-off pattern.

Figure 3:
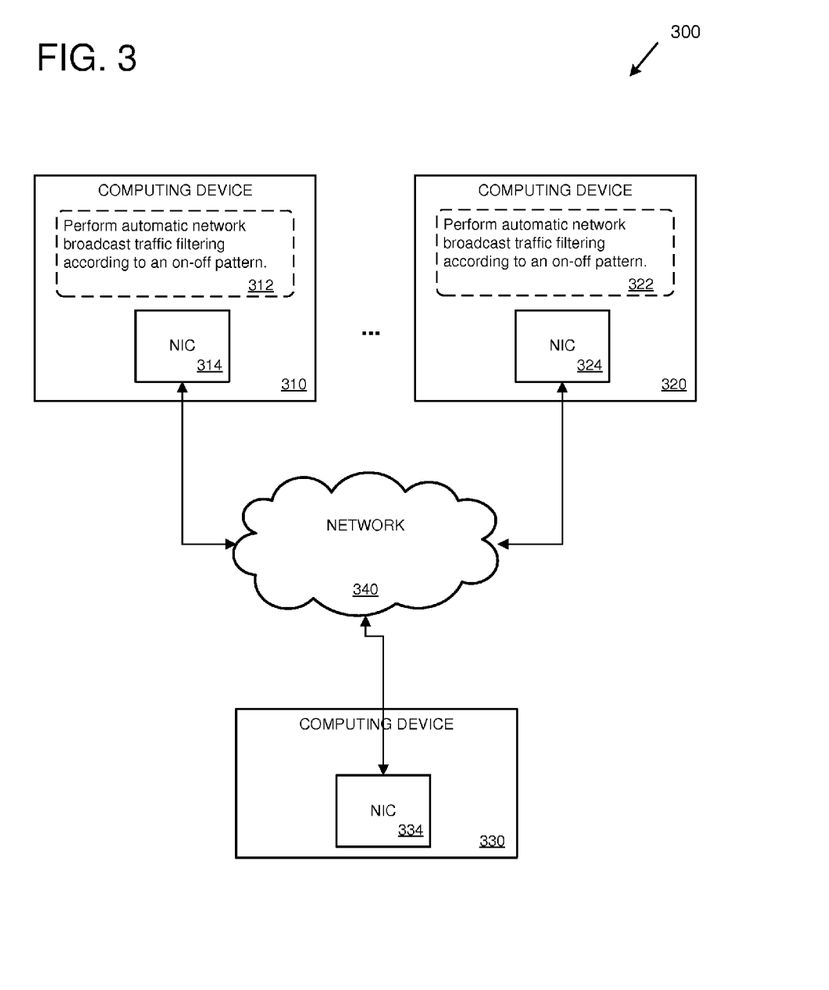
FIG. 3 is a diagram of an example environment supporting automatic network broadcast traffic filtering according to an on-off pattern.

FIG. 3 is a diagram of an example environment 300 within which automatic filtering of network broadcast traffic can be performed. The environment 300 supports automatic network broadcast traffic filtering by computing devices using an on-off pattern.

In the environment 300, a number of computing devices are connected via a network 340. The computing devices (e.g., 310, 320, and 330) can be server computers, desktop computers, laptops, tablets, smart phones, wearable computing devices, embedded devices, monitoring devices, or any other type of computing device. The computing devices are connected to the network 340 via network controllers (e.g., computing device 310 is connected via network interface 314, computing device 320 is connected via network interface 324, and computing device 330 is connected via network interface 334). In some implementations, the environment 300 can reflect, at least in part, an Internet of Things implementation in which the computing devices (e.g., 310, 320, and/or 330) can be simple devices (e.g., objects with embedded sensors, monitoring devices, automation devices, etc.) that communicate with other devices using a networking protocol (e.g., an IP-based protocol via wired and/or wireless networking). In some implementations, the network interfaces of the computing devices that perform broadcast traffic filtering (e.g., network interfaces 314 and 324) are embedded network controllers that support network broadcast traffic filtering only via enabling of a filter that blocks all broadcast traffic (e.g., advanced broadcast filtering is not supported).

The computing devices (e.g., 310, 320, and 330) communicate via the network 340. The network 340 can comprise local area networks and/or wide area networks (e.g., the Internet). The network 340 can support wired and/or wireless communication protocols. In some implementations, the network 340 is an IP-based network.

As depicted in the environment 300, some of the computing devices support automatic filtering of network broadcast traffic. Specifically, computing devices 310 and 320 perform automatic network broadcast traffic filtering according to an on-off pattern, as depicted at 312 and 322. For example, computing device 310 can determining an on-off pattern for switching network broadcast traffic filtering between an enabled setting and a disabled setting (e.g., an on-off pattern with pre-determined or fixed time periods, or an on-off pattern with dynamic time periods). When the on-off pattern specifies that network broadcast traffic filtering is to be enabled, computing device 310 enables network broadcast traffic filtering that blocks all network broadcast packets received by the network interface 314. When the on-off pattern specifies that network broadcast traffic filtering is to be disabled, computing device 310 disables network broadcast traffic filtering so that network broadcast packets received by the network interface 314 are processed by the computing device 310. Regardless of whether broadcast traffic filtering is enabled or disabled, directed network traffic received by the network interface 314 is still received and processed by the computing device 310 (i.e., network broadcast traffic filtering does not affect directed traffic). Various hardware and/or software of the computing device (e.g., computing device 310 or 320) can perform the filtering operations (e.g., determining the on-off pattern, enabling broadcast traffic filtering, disabling broadcast traffic filtering, etc.). For example, hardware, software, and/or firmware of the computing device, network controller, or other component of the computing device can perform the operations.

As depicted in the environment 300, some of the computing devices connected to the network 340 can support network broadcast traffic filtering (e.g., computing devices 310 and 320) while other computing devices connected to the network 340 may not support network broadcast traffic filtering (e.g., computing device 330).

Methods for Performing Automatic Filtering of Broadcast Traffic

In any of the technologies described herein, methods can be provided for performing automatic network broadcast traffic filtering. For example, computing devices can enable broadcast filtering of all broadcast packets during a first time period and disable filtering of all broadcast packets during a first time period (e.g., where the first and second time periods repeat as a continuous strobe pattern). The computing devices can perform broadcast filtering according to an on-off pattern with pre-determined and/or variable time periods.

Figure 4:
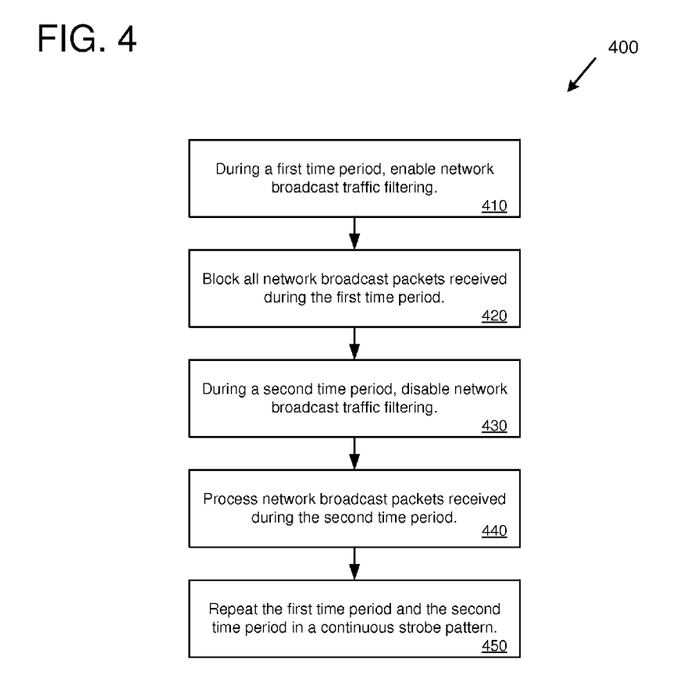
FIG. 4 is a flowchart of an example method for performing automatic network broadcast traffic filtering by a management controller using a first time period and a second time period.

FIG. 4 is a flow chart of an example method 400 for performing automatic network broadcast traffic filtering (e.g., by a management controller) using a first time period and a second time period. For example, the method 400 can be performed by a computing device with a management controller and associated network interface (e.g., by computing device 110 with management controller 112 and associated management network interface 114).

At 410, network broadcast traffic filtering is enabled during a first time period. At 420, while network broadcast traffic filtering is enabled, all network broadcast packets received (e.g., by the management controller) during the first time period are blocked or otherwise not processed. For example, the management controller and/or management network interface can block or otherwise not process any broadcast packets received during the first time period (e.g., broadcast packets can be ignored during the first time period).

At 430, network broadcast traffic filtering is disabled during a second time period. At 440, network broadcast packets received during the second time are processed. For example, the management controller and/or management network interface can receive and process broadcast packets received during the second time period.

At 450, the first and second time periods are repeated in a continuous strobe pattern. The continuous strobe pattern alternates enabling and disabling of the network broadcast traffic filtering. For example, the first time period can be a number of seconds (e.g., four seconds) and the second time period can be a number of seconds (e.g., one second), and enabling and disabling broadcast traffic filtering can be repeated (e.g., every five seconds, with four seconds enabled and one second disabled).

Figure 5:
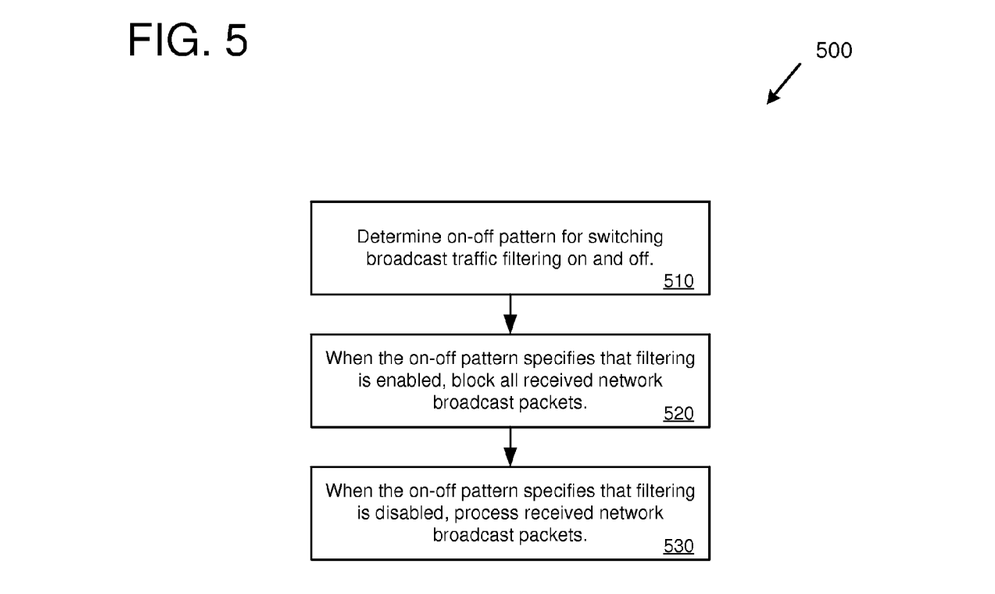
FIG. 5 is a flowchart of an example method for performing automatic network broadcast traffic filtering by a network interface or a management controller using an on-off pattern.

FIG. 5 is a flow chart of an example method 500 for performing automatic network broadcast traffic filtering (e.g., by a management controller) using an on-off pattern. For example, the method 500 can be performed by a computing device with a management controller and associated network interface (e.g., by computing device 110 with management controller 112 and associated management network interface 114). The method 500 can also be performed by a computing device with a network interface (e.g., by computing device 310 with network interface 314).

At 510, an on-off pattern is determined for switching broadcast traffic filtering on (enabling network broadcast traffic filtering) and off (disabling network broadcast traffic filtering). The on-off pattern can be defined by a first non-zero time period during which broadcast filtering is enabled and a second non-zero time period during which broadcast filtering is disabled. The first and second time periods can be fixed or pre-determined, or they can be dynamically determined and in some implementations vary over time (e.g., to adapt to current network conditions).

At 520, when the on-off pattern specifies that network broadcast traffic filtering is enabled, all received network broadcast packets are blocked or otherwise not processed. For example, the network interface or management controller can block or otherwise not process any broadcast packets received when filtering is enabled (e.g., broadcast packets can be ignored when filtering is enabled).

At 530, when the on-off pattern specifies that network broadcast traffic filtering is to be disabled, network broadcast packets are received and processed. For example, the network interface or management controller can receive and process broadcast packets when filtering is disabled.

In some implementations, the on-off pattern is defined by a first non-zero time period (e.g., a number of seconds) during which network broadcast traffic filtering is enabled and a second non-zero time period (e.g., a number of seconds) during which network broadcast traffic filtering is disabled. The on-off pattern can be a fixed pattern. For example system-defined or user-configured values can be used to define the on-off pattern (e.g., the first non-zero time period can be set to four seconds and the second non-zero time period can be set to one second).

The on-off pattern can also be a dynamic pattern (e.g., where the length of the first and second time periods can vary over time). For example, the first and second time periods can vary based on network packet queue length (e.g., indicating how many packets the queue can hold), network packet queue fullness, network traffic (e.g., broadcast traffic volume), and/or based on other criteria. In some implementations, the first and second time periods are determined based on the amount of time it takes for the network packet queue to fill up and/or clear out. For example, broadcast filtering can be enabled when the network packet queue reaches a certain level of fullness (e.g., enabled at or above 80% full) and disabled when the network packet queue fullness is reduced to a certain level (e.g., disabled at or below 20% full). In some implementations, the first and second time periods are determined based on network packet queue size (e.g., the first time period can be larger and/or the second time period smaller when the queue size is small). In some implementations, network traffic volume (e.g., broadcast traffic volume) affects the on-off pattern (e.g., the amount of time broadcast filtering is enabled can be increased when broadcast traffic volume is high and reduced when broadcast traffic volume is low). Combined approaches can also be used where the on-off pattern is affected by considering multiple criteria.

The first and second time periods can also vary based on a sliding window approach where the amount of time that broadcast filtering is enabled increase over a number of successive on-off instances of the on-off pattern. For example, the first time period can increase over time in comparison to the second time period (e.g., the first time period may start at 5 seconds, but may increase over time to 7 seconds, 9 seconds, and so on, while the second time period may remain the same or decrease). For example, the first time period can be increased if network conditions are not adversely affected (e.g., if the larger percentage of time that broadcast filtering is enabled does not negatively impact network performance, such as delayed network packets that are blocked waiting for broadcast traffic).

Example Service Provider Environments

Figure 6:
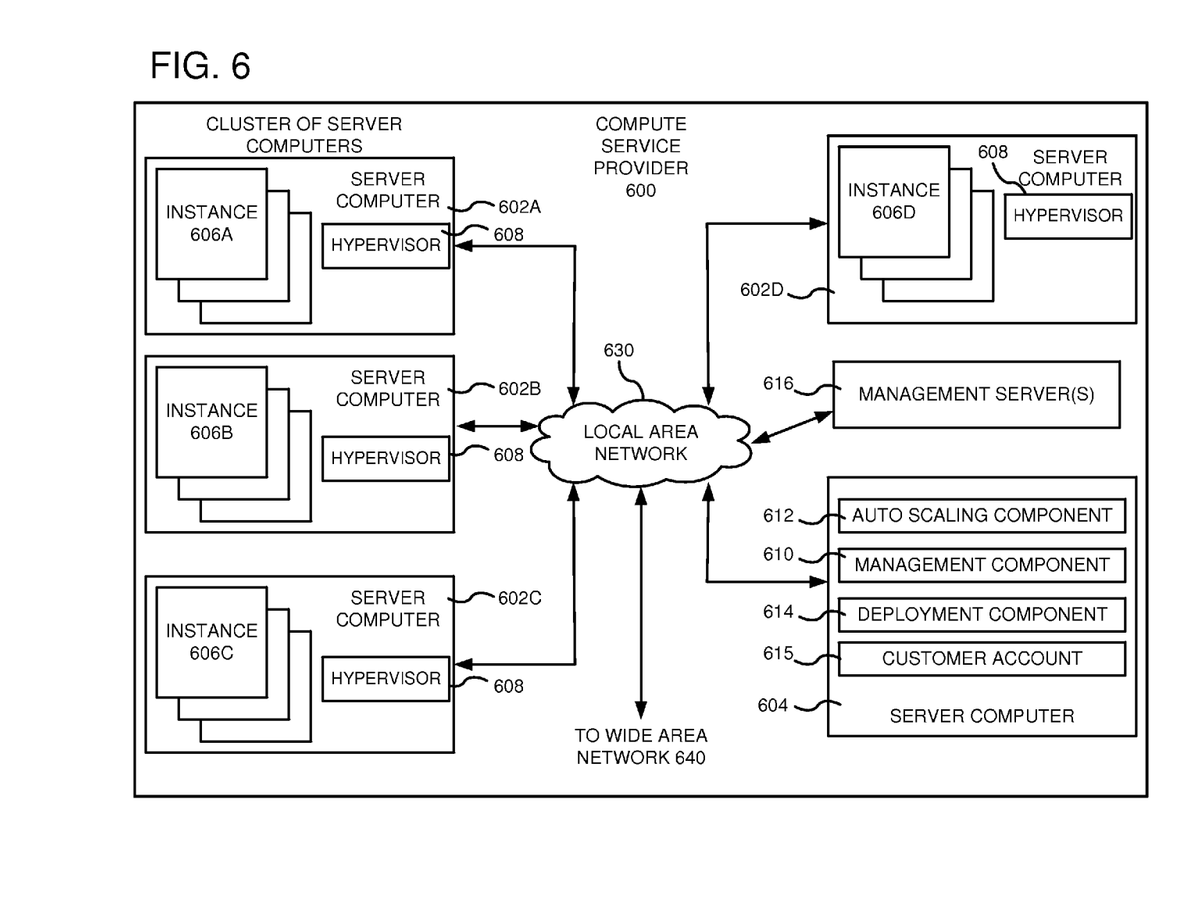
FIG. 6 is an example system diagram showing a plurality of virtual machine instances running in a multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example, each of the servers 602A-602D can be configured to execute a hypervisor 608 or another type of program configured to enable the execution of multiple instances 606 on a single server. For example, each of the servers 602A-602D can be configured (e.g., via the hypervisor 608) to support one or more virtual machine slots, with each virtual machine slot capable of running a virtual machine instance (e.g., server computer 602A could be configured to support three virtual machine slots each running a corresponding virtual machine instance). Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

In some implementations, the server computers 602A-602D have a separate management network interface and associated management controller. The management network interfaces of the server computers 602A-602D connect to a separate management network (e.g., the local area network 630 can comprise at least two networks, a management network that carries management traffic and a general data network for all other traffic). The management controllers of the server computers 602A-602D can perform network broadcast traffic filtering by enabling broadcast filtering during a first time period and disabling broadcast filtering during a second time period and apply the first and second time periods as a repeating pattern (e.g., as an on-off pattern).

In some implementations, one or more management servers 616 (also called console servers or management consoles) are present. The management servers 616 connect to the management network along with the management controllers of the server computers 602A-602D. The management servers 616 monitor the management network and can receive management traffic from the server computers 602A-602D (e.g., status information, such as component temperatures, fan speeds, etc.), send alerts and notifications, and/or control the server computers 602A-602D via the management controllers (e.g., adjust fan speeds, perform remote restarts, etc.). In some implementations, the management servers 616 can also configure network broadcast traffic filtering settings of the server computers 602A-602D. For example the management servers 616 can configure first and second time periods as fixed settings (e.g., implementing a filtering policy) and/or dynamically adjust settings on an individual server and/or group of servers basis (e.g., based on network queue size of one or more servers, current broadcast traffic volume of the management network, and/or based on other criteria).

Figure 7:
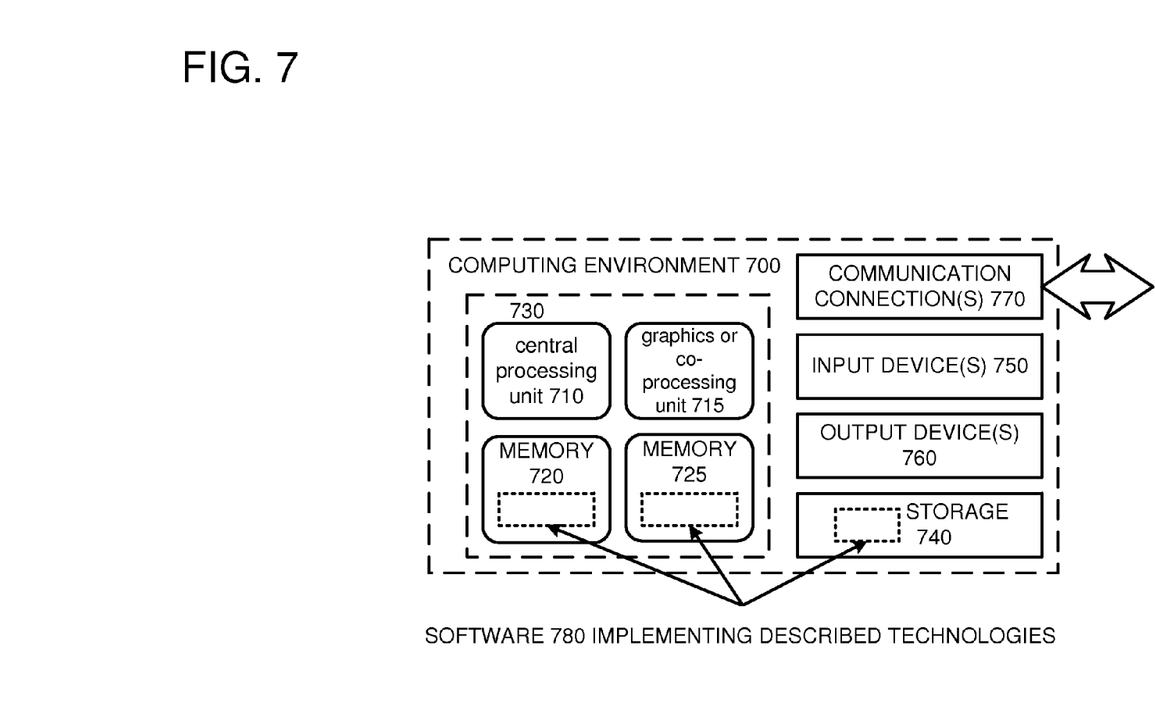
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.)

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented by a management controller of a computing device, for performing automatic network broadcast traffic filtering, the method comprising:
during a first time period:
enabling, by the management controller, network broadcast traffic filtering that blocks all network broadcast packets received by the management controller during the first time period,
wherein the management controller is a component of a server computing device, wherein the management controller connects to a management network, separate from a general data network, that communicates management network traffic between the server computing device and other server computing devices; and
during a second time period immediately following the first time period:
disabling, by the management controller, the network broadcast traffic filtering, wherein network broadcast packets received during the second time period when network broadcast traffic filtering is disabled are processed by the management controller;
wherein the first time period and the second time period are repeated by the management controller as a continuous strobe pattern that alternates enabling and disabling of the network broadcast traffic filtering; and
wherein the network broadcast traffic filtering does not block directed packets.

2. The method of claim 1 wherein the first time period is a first pre-determined number of seconds, and wherein the second time period is a second pre-determined number of seconds.

3. The method of claim 1 wherein the first time period is four seconds, wherein the second time period is one second, and wherein the strobe pattern repeats every five seconds.

4. The method of claim 1 wherein the network broadcast packets comprise address resolution protocol (ARP) broadcast packets and universal plug and play (UPnP) multicast packets.

5. A computing device comprising:
one or more processing units;
a management controller comprising a network interface; and
a second network interface connected to a general data network, wherein the network interface of the management controller is connected to a management network separate from the general data network;
wherein the computing device is configured to perform operations for automatic network broadcast traffic filtering, the operations comprising:
determining an on-off pattern for switching network broadcast traffic filtering between an enabled setting and a disabled setting;
when the on-off pattern specifies that network broadcast traffic filtering is to be enabled, enabling network broadcast traffic filtering that blocks all network broadcast packets received by the network interface of the management controller; and
when the on-off pattern specifies that network broadcast traffic filtering is to be disabled, disabling network broadcast traffic filtering so that network broadcast packets received by the network interface are processed by the management controller;
wherein the network broadcast traffic filtering does not block directed packets.

6. The computing device of claim 5 wherein the on-off pattern is repeated by the management controller as a continuous strobe pattern that alternates enabling and disabling of the network broadcast traffic filtering.

7. The computing device of claim 5 wherein the on-off pattern is defined by a first non-zero time period when the network broadcast traffic filtering is enabled and a second non-zero time period when the network broadcast traffic filtering is disabled.

8. The computing device of claim 7 wherein the first non-zero time period and the second non-zero time period are pre-determined values.

9. The computing device of claim 7 wherein the first non-zero time period is four seconds, wherein the second non-zero time period is one second, and wherein the on-off pattern is repeated every five seconds in a continuous strobe pattern.

10. The computing device of claim 7 wherein the first non-zero time period and the second non-zero time period are dynamic values that vary based, at least in part, on network packet queue size of the network interface of the management controller.

11. The computing device of claim 7 wherein the first non-zero time period and the second non-zero time period are dynamic values that vary based, at least in part, on both: network packet queue size of the network interface of the management controller and broadcast traffic volume.

12. The computing device of claim 7 wherein the first non-zero time period and the second non-zero time period are dynamic values that vary based, at least in part, on network packet queue fullness.

13. The computing device of claim 7 wherein the first non-zero time period increases over a number of successive on-off instances of the on-off pattern.

14. The computing device of claim 5 wherein the network broadcast packets comprise address resolution protocol (ARP) broadcast packets.

15. A computer-readable storage medium storing computer-executable instructions for causing a computing device comprising a network interface to perform operations for network broadcast traffic filtering, the operations comprising:
determining an on-off pattern for switching network broadcast traffic filtering between an enabled setting and a disabled setting;
when the on-off pattern specifies that network broadcast traffic filtering is to be enabled, enabling network broadcast traffic filtering that blocks all network broadcast packets received by the network interface; and
when the on-off pattern specifies that network broadcast traffic filtering is to be disabled, disabling network broadcast traffic filtering so that network broadcast packets received by the network interface are processed by the computing device;
wherein the on-off pattern is repeated to alternate enabling and disabling of the network broadcast traffic filtering;
wherein the network broadcast traffic filtering does not interfere with directed packets; and
wherein the on-off pattern comprises a first non-zero time period when the network broadcast traffic filtering is enabled and a second non-zero time period when the network broadcast traffic filtering is disabled, and wherein the first non-zero time period and the second non-zero time period are dynamic values that vary based, at least in part, on one or more of:
network packet queue size of the network interface;
network packet queue fullness; or
broadcast traffic volume.

16. The computer-readable storage medium of claim 15, wherein the network interface of the computing device is an embedded network interface that supports network broadcast traffic filtering only via enabling of a broadcast filter that blocks all broadcast traffic.

\* \* \* \* \*